(12) United States Patent
Ando et al.

(10) Patent No.: US 7,531,156 B2
(45) Date of Patent: May 12, 2009

(54) METHOD AND DEVICE FOR SYNTHESIZING HIGH ORIENTATIONALLY ARRANGED CARBON NANO-TUBE BY USING ORGANIC LIQUID

(75) Inventors: Toshihiro Ando, Ibaraki (JP); Mika Gamo, Ibaraki (JP); Yafei Zhang, Ibaraki (JP)

(73) Assignees: Japan Science and Technology Agency, Kawaguchi-shi (JP); National Institute for Materials Science, Tsukuba-shi (JP)

( * ) Notice: Subject to any disclaimer, the term of this patent is extended or adjusted under 35 U.S.C. 154(b) by 802 days.

(21) Appl. No.: 10/481,771

(22) PCT Filed: Jun. 21, 2002

(86) PCT No.: PCT/JP02/06235

§ 371 (c)(1),
(2), (4) Date: Dec. 23, 2003

(87) PCT Pub. No.: WO03/000590

PCT Pub. Date: Jan. 3, 2003

(65) Prior Publication Data

US 2004/0151653 A1 Aug. 5, 2004

(30) Foreign Application Priority Data

Jun. 26, 2001 (JP) .............................. 2001-193629

(51) Int. Cl.
*B82B 3/00* (2006.01)
(52) U.S. Cl. ..................... 423/447.1; 427/228; 977/844
(58) Field of Classification Search .............. 423/447.1; 977/844; 427/228
See application file for complete search history.

(56) References Cited

U.S. PATENT DOCUMENTS 6,350,488 B1 * 2/2002 Lee et al. ................. 427/249.1

FOREIGN PATENT DOCUMENTS

| JP | 2000-109308 | 4/2000 |
|----|-------------|--------|
| JP | 2001-48507  | 2/2001 |
| JP | 2001-81564  | 3/2001 |
| JP | 2001-262343 | 9/2001 |
| WO | 99-65821    | 12/1999 |
| WO | WO 00/61492 | * 10/2000 |

OTHER PUBLICATIONS

Klara Hernadi et al.; Elsevier, Applied Catalysis A: General, vol. 199, pp. 245-255, 2000. Cited in the int'l. search report.
M. Kusunoki et al.; Philosophical Magazine Letters, vol. 79, No. 4, pp. 153-161, 1999. Cited in the int'l. search report.
Yafei Zhang et al.; The Japan Society of Applied Physics, vol. 41, pp. L408-L411, Apr. 2002. Cited in the int'l. search report.
Fan, S. et al, "*Self-oriented regular arrays of carbon nanotubes and their field emission properties*", Science, vol. 283 (Jan. 22, 1999), pp. 512-514.
Notice of Rejection mailed Jul. 27, 2004 for the corresponding Japanese patent application.
Cheol Jin Lee et al. "Growth of well-aligned carbon nanotubes on a large area of Co—Ni co-deposited silicon oxide substrate by thermal chemical vapor deposition", Chemical Physics Letters, received Jan. 14, 2000, in final form Mar. 30, 2000, pp. 554-559.

* cited by examiner

*Primary Examiner*—Stuart Hendrickson
(74) *Attorney, Agent, or Firm*—Westerman, Hattori, Daniels & Adrian, LLP.

(57) ABSTRACT

A method capable of synthesizing carbon nanotubes at low cost and large quantities, an apparatus usable for carrying out the method, and carbon nanotubes densely aligned on and firmly bonded to a Si substrate over, and oriented perpendicular to, an entire surface thereof are provided. Highly oriented, aligned carbon nanotubes are synthesized from an organic liquid by forming a substrate with a buildup thereon of a thin film or fine insular particles composed of at least one metallic element; exposing the substrate (3) having the buildup to a hydrogen plasma; and heating the substrate (3) exposed to the hydrogen plasma in the organic liquid (10) to a predetermined temperature. The synthesis apparatus comprises: a liquid chamber or tank (1) for an organic liquid; a water cooling means (2) for cooling the liquid tank (1) from its outside; a substrate holder (5) for holding a substrate (3), the holder having electrodes (4) for passing an electric current through the substrate (3); a condensing means (7) comprising water cooling tubes (6) for cooling and condensing vapor made from the organic liquid by its vaporization to return it to the liquid for return into the liquid tank (1); a valve (8) through which $N_2$ gas is introduced; and a lid (9) that carries the substrate holder (5), the condensing means (7) and the valve (8). The organic liquid (10) is thus tightly sealed in the liquid tank (1) by the lid (9). This synthesis apparatus allows carbon nanotubes to be synthesized in large quantities, at low cost and in safety. Highly coaxially and densely oriented, aligned carbon nanotubes can be synthesized in the form of a bundle thereof, which when used in a variety of products brings about various excellent effects including extremely high usability.

11 Claims, 7 Drawing Sheets

(a) 2 μm (b) 2 μm

METHOD AND DEVICE FOR SYNTHESIZING HIGH ORIENTATIONALLY ARRANGED CARBON NANO-TUBE BY USING ORGANIC LIQUID

TECHNICAL FIELD

The present invention relates to a method of synthesizing aligned and oriented carbon nanotubes from an organic liquid and an apparatus for use in carrying out the method as well as carbon nanotubes made by the method.

BACKGROUND ART

Carbon nanotubes, which possess unique electrical and mechanical properties, have a high potential applicability to the future nanotechnologies such as field emission electron sources, nanoscale electronic devices, chemical storage systems, and mechanical reinforcement materials.

Since carbon nanotubes was discovered in a cathodic deposit produced with an electric discharge brought about using a carbon electrode in a fullerene forming apparatus, a variety of techniques have been proposed for synthesizing carbon nanotubes. These synthesis techniques aim to be able to produce carbon nanotube in large quantities and also to synthesize carbon nanotubes having a specific function. Such specific functions are, among others, the function to suspend the catalytic ability for a hydrocarbon, the function to electrolyze a condensate phase and the catalytic function for SiC sublimation. Such carbon nanotubes must have an oriented growth structure that agrees with such a particular function.

The synthesis methods so far proposed have been found, however, to be capable of producing carbon nanotubes only at a yield just enough for them to be used in research and far less than the methods can be applied to their industrial production. Another problem with these prior methods is that the nanotubes aligned thereby on a substrate are week in their bonding strength with the substrate and are thus hard to handle.

It would be advantageous if carbon nanotubes can be synthesized in large quantities and at a low cost using the most updated Si technology, for example, by the use of a material and equipment employed in the Si semiconductor process. Then, it will be possible to supply at low cost and in bulk nanotechnology products which with the best use of the unique properties of carbon nanotubes are functionally excellent.

DISCLOSURE OF THE INVENTION

With the aforementioned prior-art problems taken into account, the present invention has for its objects to provide a synthesis method that allows a carbon nanotube or nanotubes to be produced at a low cost and large quantities and an apparatus for use in carrying out the method as well as carbon nanotubes made by the method, the carbon nanotube or nanotubes being firmly bonded to a substrate as highly oriented and densely aligned thereon.

In order to achieve the first of the objects mentioned above, there is provided in accordance with the present invention a method of synthesizing highly oriented, aligned carbon nanotubes from an organic liquid, characterized in that it comprises the steps of: forming a substrate with a buildup thereon of a thin film or fine insular particles composed of at least one metallic element; exposing the said substrate having the said buildup to a hydrogen plasma; and heating the said substrate exposed to the hydrogen plasma in an organic liquid to a predetermined temperature whereby highly oriented, aligned carbon nanotubes are synthesized.

The said substrate is preferably a Si substrate.

The said at least one metallic element of which the said buildup is composed is preferably one or more elements selected from the group which consists of Fe, Co and Ni.

The organic liquid may be alcohol, e. g., methanol or ethanol. The Si substrate may be heated to a predetermined temperature by passing an electric current therethrough.

According to this method, exposing to a high-temperature hydrogen plasma a Si substrate formed thereon with either a thin Fe film or fine insular particles composed of, e. g., Fe element, will cause either the thin Fe film to become fine particles of nanometers in size distributed insularly on the Si substrate and firmly bonded thereto, or the fine insular particles to be firmly bonded to the Si substrate, thereby forming fine Fe liquid particles. Then, heating the Si substrate to a high temperature by passing an electric current therethrough will cause the organic liquid in the vicinity of the Si substrate to be decomposed by a catalytic reaction in a thermal non-equilibrium state to form carbon atoms and then lead to the supersaturated solution of such formed carbon atoms into those fine Fe liquid particles. Then, the sharp temperature gradient between the high-temperature Si substrate surface and the organic liquid adjacent thereto will cause the carbon atoms in the fine Fe liquid particles to be precipitated on their surfaces, thereby forming growth nuclei. With these growth nuclei continuously supplied with carbon atoms from the fine Fe liquid particles, carbon nanotubes grow in a direction perpendicular to the Si substrate surface.

This method, which permits using a raw material and equipment commonly used in the conventional semiconductor process, allows low-cost production. Also, the method whereby nanotubes are grown concurrently over an entire Si substrate surface allows their mass production. Further, the method wherein the Si substrate need not be of single crystal makes the substrate of low-cost material.

Furthermore, by this method which permits a choice among a variety of types of the organic liquid, so-called doped nanotubes can be synthesized, which contain an element or elements other than carbon.

There is also provided in accordance with the present invention an apparatus for synthesizing highly oriented, aligned carbon nanotubes, characterized in that it comprises: a liquid tank for retaining an organic liquid; a cooling means for cooling the said organic liquid so as to maintain it at a temperature lower than a boiling point thereof; a condensing means for condensing the said organic liquid becoming gaseous in phase into its original liquid phase and returning the same into the said liquid tank; a substrate holding means having an electrode means for passing an electric current through the said substrate in the said organic liquid; an inert gas inlet means for removing air from the said apparatus; and a tank sealing means for sealing the said liquid tank to prevent the said organic liquid becoming gaseous in phase from flying off.

This apparatus makeup allows an organic liquid to be held at a temperature lower than its boiling point and the substrate at a high growth-temperature and enables highly oriented, aligned carbon nanotubes to be synthesized.

Also, the apparatus whereby a gasified portion of the organic liquid is condensed and returned to its original liquid phase has no wasteful consumption of the organic liquid as the raw material. Further, there may be no risk of the gasified liquid organic mixing with air and then causing an explosion or burning.

Also, having the means for introducing the inert gas further eliminates the risk of the gasified liquid organic mixing with air and then causing an explosion or burning in the liquid tank.

There is also provided in accordance with the present invention highly oriented, aligned carbon nanotubes, characterized in that such carbon nanotubes are densely aligned on and firmly bonded to a Si substrate over, and oriented perpendicular to, an entire surface thereof.

There is also provided in accordance with the present invention highly oriented, aligned carbon nanotubes, characterized in that such carbon nanotubes are coaxially oriented, equal in length, and fastened together.

So constructed as mentioned above, the carbon nanotubes which are densely aligned on and firmly bonded to a Si substrate over, and oriented perpendicular to, an entire surface thereof are readily machinable into, e. g., a device.

The carbon nanotubes which are coaxially oriented, equal in length, and fastened together are readily machinable into, e. g., a device.

According to the present invention, carbon nanotubes can be synthesized at low cost. Accordingly, many nanotechnology products which make the best use of unique properties of carbon nanotubes can be produced at low cost and in large quantities.

BRIEF DESCRIPTION OF THE DRAWINGS

The present invention will better be understood from the following detailed description and the drawings attached hereto showing certain illustrative forms of embodiment of the present invention. In this connection, it should be noted that such forms of embodiment illustrated in the accompanying drawings hereof are intended in no way to limit the present invention but to facilitate an explanation and understanding thereof. In the drawings.

BEST MODES FOR CARRYING OUT THE INVENTION

Figure 1:
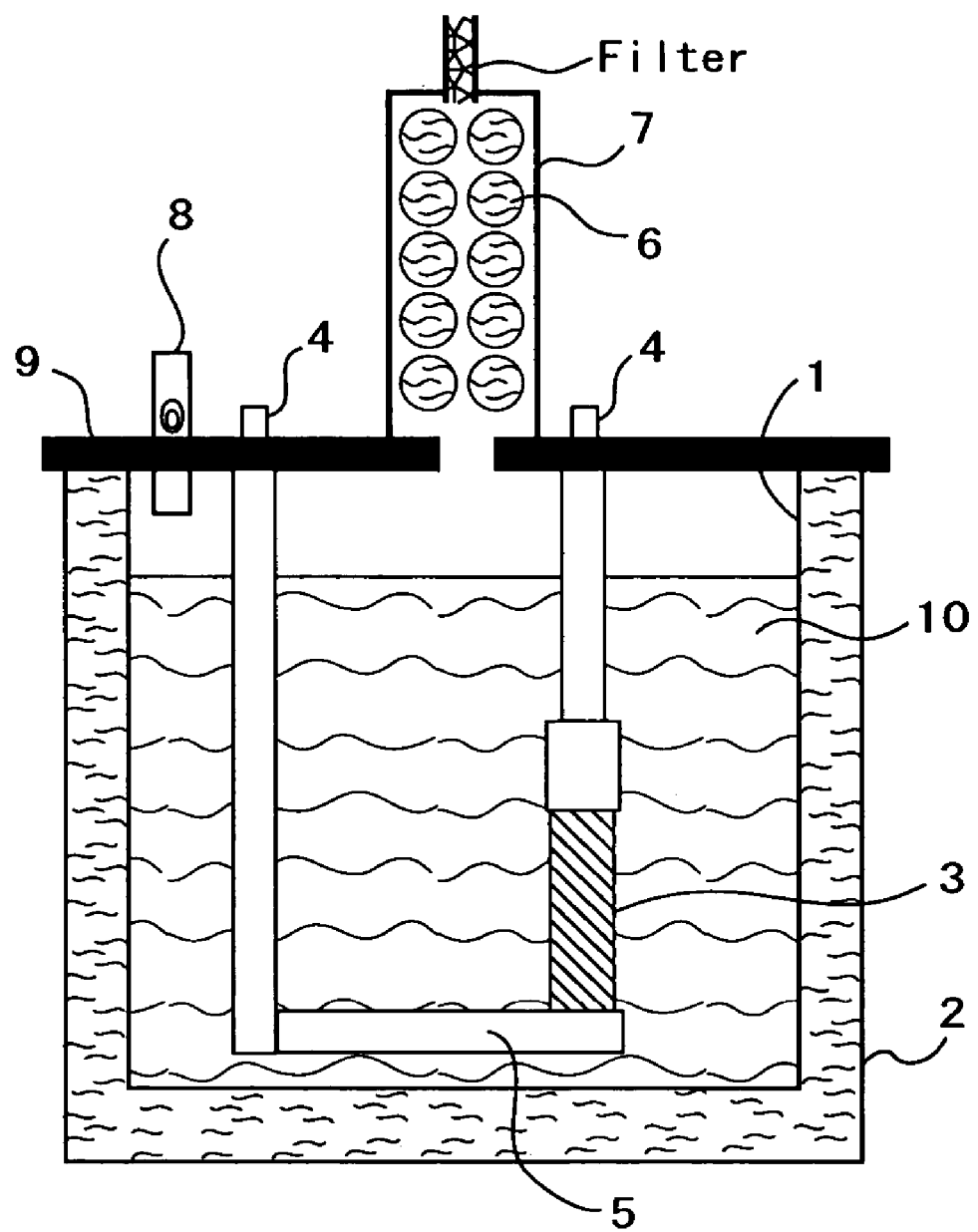
FIG. 1 is a diagram illustrating the makeup of an apparatus for synthesizing highly oriented, aligned carbon nanotubes from an organic liquid in accordance with the present invention.

Hereinafter, the present invention will be described in detail with reference to suitable forms of implementation thereof illustrated in the drawing figures.

At the outset, mention is made of an apparatus aspect of the synthesis of a highly oriented, aligned carbon nanotube or nanotubes from an organic liquid in accordance with the present invention.

FIG. 1 is a diagram illustrating the makeup of an apparatus for synthesizing highly oriented, aligned carbon nanotubes from an organic liquid in accordance with the present invention. The synthesis apparatus includes a liquid chamber or tank 1 for an organic liquid; a water cooling means 2 for cooling the liquid tank 1 from its outside; a substrate holder 5 for holding a substrate 3, the holder having electrodes 4 for passing an electric current through the substrate 3; a condensing means 7 comprising a plurality of water cooling tubes 6 for cooling and condensing vapor made from the organic liquid 10 by its vaporization to return the vapor to the liquid for return into the liquid tank 1; a valve 8 for introducing $N_2$ gas; and a lid 9 that carries the substrate holder 5, the condensing means 7 and the valve 8. The organic liquid 10 is thus tightly sealed in the liquid tank 1 by the lid 9.

In order to permit carbon nanotubes to be synthesized from the organic liquid, this apparatus is designed to maintain the organic liquid at a temperature lower than its boiling point and the substrate at a high growth temperature. Also, a vaporized or gasified portion of the organic liquid is returned upon condensation so that there can be no wasteful consumption of the organic liquid as the raw material and further so that there may be no risk of the gasified liquid organic mixing with air and then causing an explosion or burning. Also, having the means for introducing the inert gas further eliminates the risk of the gasified liquid organic mixing with air and then causing an explosion or burning in the liquid tank.

Mention is next made of a method of synthesizing highly oriented, aligned carbon nanotubes from an organic liquid in accordance with the present invention and using the synthesis apparatus shown in FIG. 1. An example is here taken in which the substrate is composed of Si, the metallic thin film is a Fe thin film, the organic liquid is methanol.

The Si substrate, which is electrically conductive, is washed and cleaned, a Fe thin film is built up thereon, e. g., by sputtering in an argon atmosphere, to a film thickness that is selected to meet with a particular purpose to be achieved since the film thickness determines the diameter and density of nanotubes being synthesized.

The Si substrate having the Fe thin film built up thereon is exposed to a hydrogen plasma and heated at a temperature of 850° C. This plasma treatment makes the Fe thin film become fine liquid particles which are distributed insularly over the Si substrate and firmly bonded thereto. The exposure with the hydrogen plasma also makes the fine liquid particles uniform in their diameter and distribution.

The Si substrate exposed to the hydrogen plasma is disposed on the substrate holder 5 in the synthesis apparatus of FIG. 1, which is then supplied with methanol 10 and thereafter has $N_2$ gas introduced through the valve 8 to replace the residual air in the synthesis apparatus therewith.

Next, an electric current is passed through the Si substrate between the electrodes 4 to heat the Si substrate. The electric current is selected in magnitude such that the Si substrate has a temperature of 930° C., and this selected current magnitude is maintained during the synthesis. Bubbles made of methanol gas are produced from the surface of the Si substrate, which is covered with these bubbles. Here, it is necessary that the methanol 10 be maintained at a temperature lower than its boiling point, and to this end it is cooled using the water cooling means 2. Also, a gasified portion of the methanol liquid is returned by the condensing means 7 to the liquid phase which is returned to the liquid tank 1.

The synthesis apparatus is held in the state mentioned above for a given time period in which the carbon nanotubes being synthesized grow to a desired length.

The growth mechanism of the carbon nanotubes synthesized in accordance with the present invention is considered as mentioned below. An example is here again taken in which the substrate is composed of Si, the metallic thin film is a Fe thin film and the organic liquid is methanol.

Figure 2:
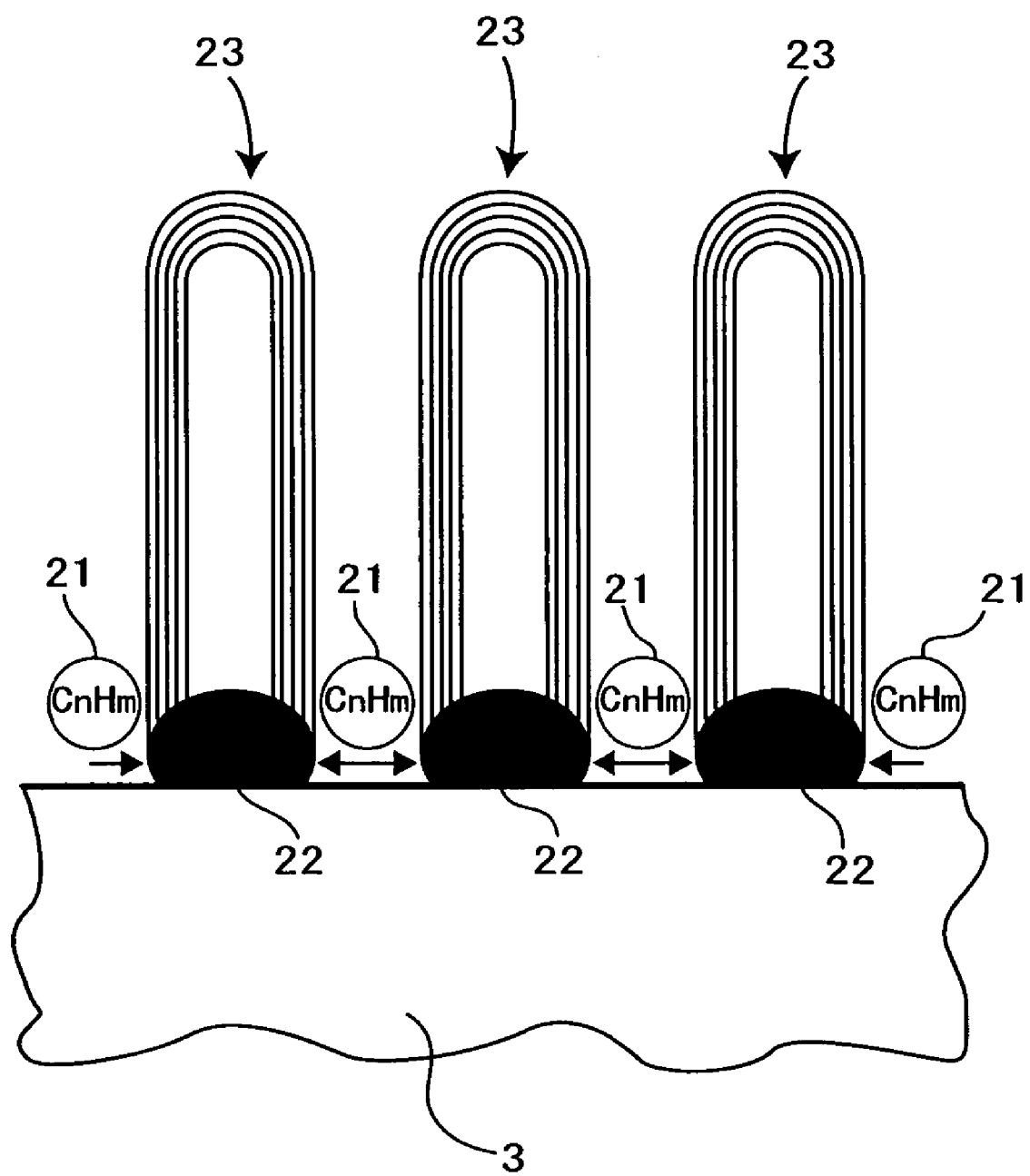
FIG. 2 is a diagram illustrating a growth mechanism of carbon nanotubes synthesized using an organic liquid in accordance with the present invention.

FIG. 2 is a diagram illustrating a growth mechanism of carbon nanotubes synthesized using an organic liquid in accordance with the present invention. In the Figure, the surface of the Si substrate 3 is held at an elevated temperature of about 900° C. while the methanol liquid adjacent to the surface of the Si substrate 3 is held at a temperature of about 60° C. Also, the surface of the Si substrate 3 is covered with methanol gas 21, and there exists a sharp temperature gradient from the Si substrate surface towards the liquid. It is considered that this sharp temperature gradient coupled with the catalytic action of Fe brings about a unique pyrolytic reaction in the methanol gas 21, which in turn generates carbon atoms that penetrate into the fine Fe liquid particles 22. To wit, the catalytic reaction of Fe in a thermal non-equilibrium state generates carbon atoms.

The generated carbon atoms penetrate into a fine Fe liquid particle 22 which is supersaturated therewith. The temperature gradient across the Si substrate surface causes the carbon atoms in the fine Fe liquid particle 22 to be precipitated on a surface thereof, thereby forming a growth nucleus thereon, which is then continuously supplied with carbon atoms from the fine Fe liquid particle 22 with the result that a carbon nanotube 23 grows on the nucleus.

Example 1 is next shown.

In this Example, use was made of high-purity (99.7%) methanol for the organic liquid. Also used was a (100) face-oriented Si substrate having a low resistivity of 0.002 Ω·cm and being 10×20×1 mm³ in size. The Si substrate was washed and cleaned, first supersonically in acetone and then by etching with a 3% hydrofluoric acid (hydrogen fluoride) solution.

The (100) Si substrate had a Fe thin film of 25 nm thick built up thereon by sputtering in Ar gas and thereafter was subjected to the in-hydrogen plasma treatment at a substrate temperature of 850° C. for a time period of 20 minutes to increase the adhesive strength of the Fe thin film to the substrate and to form fine Fe particles in order to form nuclei for the growth of carbon nanotubes.

This Si substrate was disposed on the substrate holder 3 of FIG. 1 and heated to a temperature of 930° C. by passing a direct current therethrough. A large number of bubbles were formed, rising to the methanol liquid surface, and the Si substrate surface was covered with these bubbles. The temperature of the methanol liquid in the liquid tank 1 rose to about 60° C. The cooling means 2 was needed to maintain the methanol liquid at a temperature lower than its boiling point and so was the condensing means 7 to recover a vaporized portion of the methanol liquid. The Si substrate temperature was measured using an optical radiation thermometer with its focal point focused on a substrate surface area whose temperature was to be measured. The electric current passed through the Si substrate was maintained in magnitude during the growth. It was observed that the substrate temperature decreased gently as the carbon nanotubes became longer in length.

Figure 3:
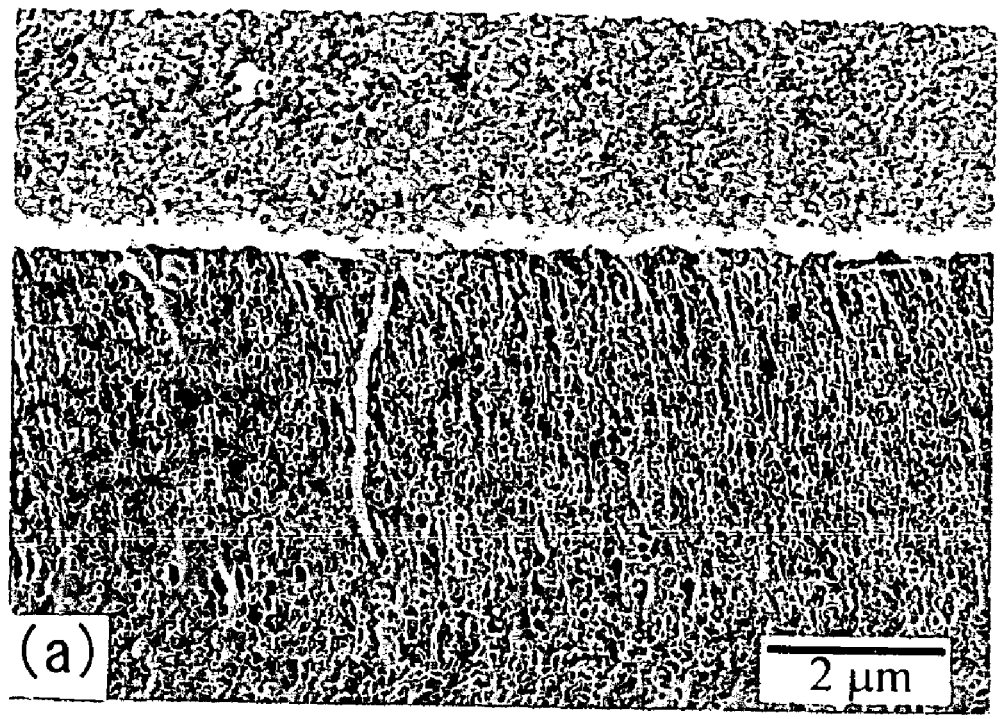
FIG. 3 shows images by SEM (Scanning Electron Microscope) of the carbon nanotubes synthesized.
Figure 3:
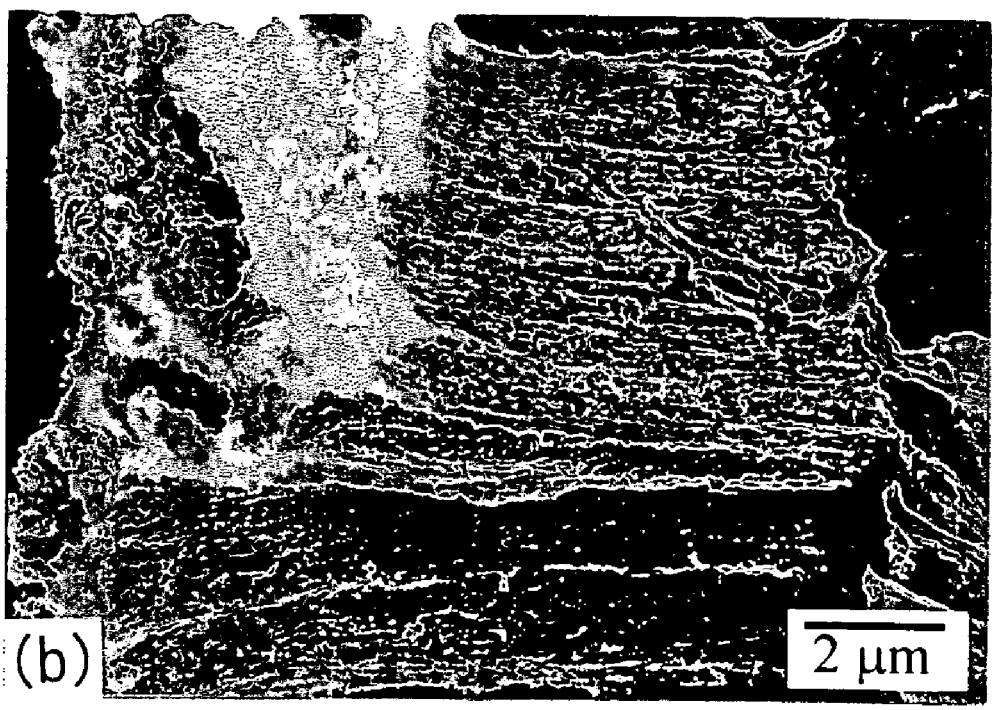

FIG. 3 shows images by SEM (Scanning Electron Microscope) of the carbon nanotubes synthesized. FIG. 3(a) shows an SEM image taken from obliquely above of carbon nanotubes in a plane of cleavage. Seen flat in the upper part of the Figure indicates the upper surface of the carbon nanotubes and seen striped or fibrous in the lower part of the Figure indicates side faces of the carbon nanotubes grown densely and perpendicular to the Si substrate. From the Figure, it is clearly seen that the carbon nanotubes which are coaxial and equal in length have grown perpendicular to the Si substrate and densely over the entire Si substrate surface.

FIG. 3(b) shows an SEM image of the carbon nanotubes stripped off from the Si substrate. From the Figure it is seen that stripped off from the Si substrate, the carbon nanotubes which are coaxial and equal in length lie in the state that they stick to one another to form a bundle thereof. Also, the ends of the carbon nanotubes draw together to form a flat profile. With the naked eye, it is seen as if it is a black lump. The carbon nanotubes on the Si substrate never came off without an external force applied to them, e. g., unless they are scratched with something hard.

The axial growth rate of the carbon nanotubes increased as the substrate temperature was increased. The nanotubes grew longer lengthwise with time. With the EDX (Energy Dispersive X-ray) device attached to the SEM unit, it was confirmed that the carbon nanotubes were chemically composed of carbon alone. It is clearly seen from the Figure that a bundle of carbon nanotubes which are highly dense and coaxially oriented is obtained according to the synthetic method of the present invention.

Figure 4:
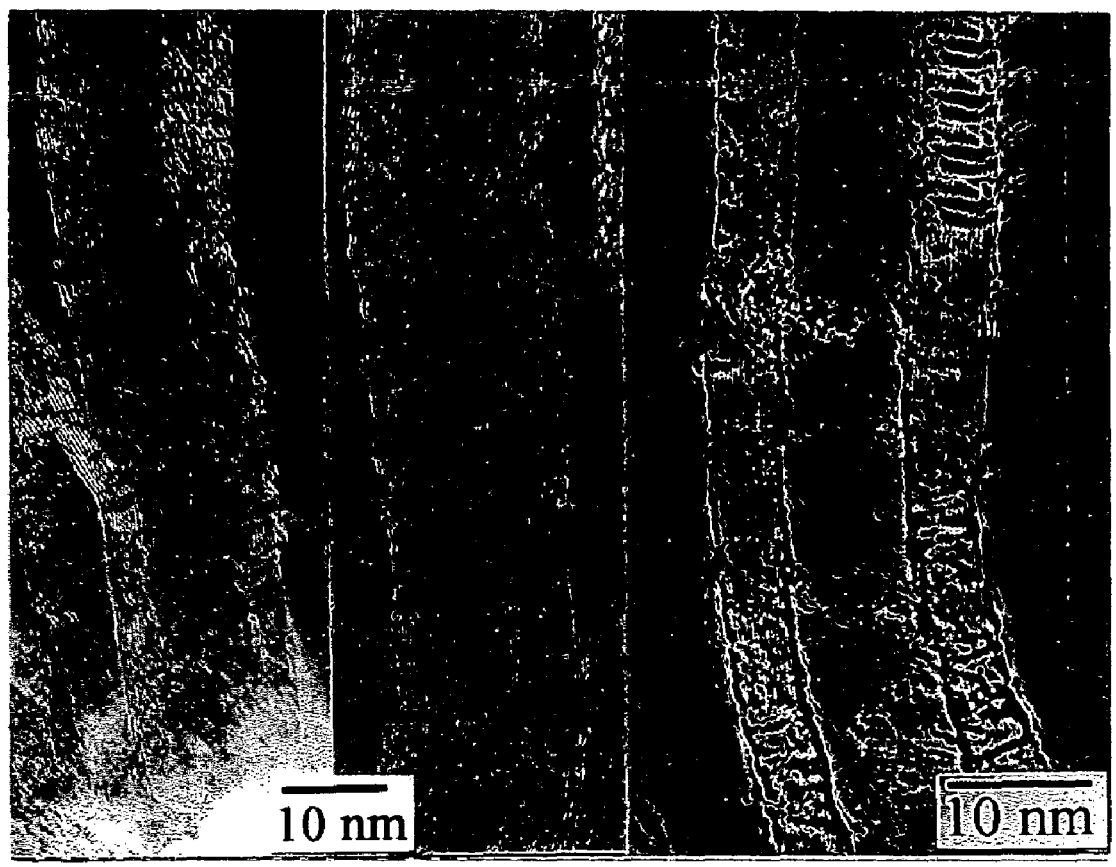
FIG. 4 shows images by HRTEM (High Resolution Transmission Electron Microscope) of the synthesized carbon nanotube.

FIG. 4 shows images by HRTEM (High Resolution Transmission Electron Microscope) of the synthesized carbon nanotube. As is apparent from FIG. 4, the carbon nanotube is basically gentle, uniform, hollow, and multi-layered. The multi-layered nanotube had its layers spaced apart from one another by a distance of 0.34 nm. The carbon nanotubes for the most part are uniform, and some of them are somewhat irregular, in radius over their length. The carbon nanotubes had their outer diameters ranging and distributed between 13 and 26 nm with 20 nm as the center of distribution. The carbon nanotubes had a ratio of their radius to wall or shell thickness ranging from about 1.2 to 2.1. Some lattice mismatches and defects were found in the edge and surface areas of the tube walls. This is considered to be due to radical oxygen atoms produced by uneven catalytic reactions on the Si substrate surface.

Figure 5:
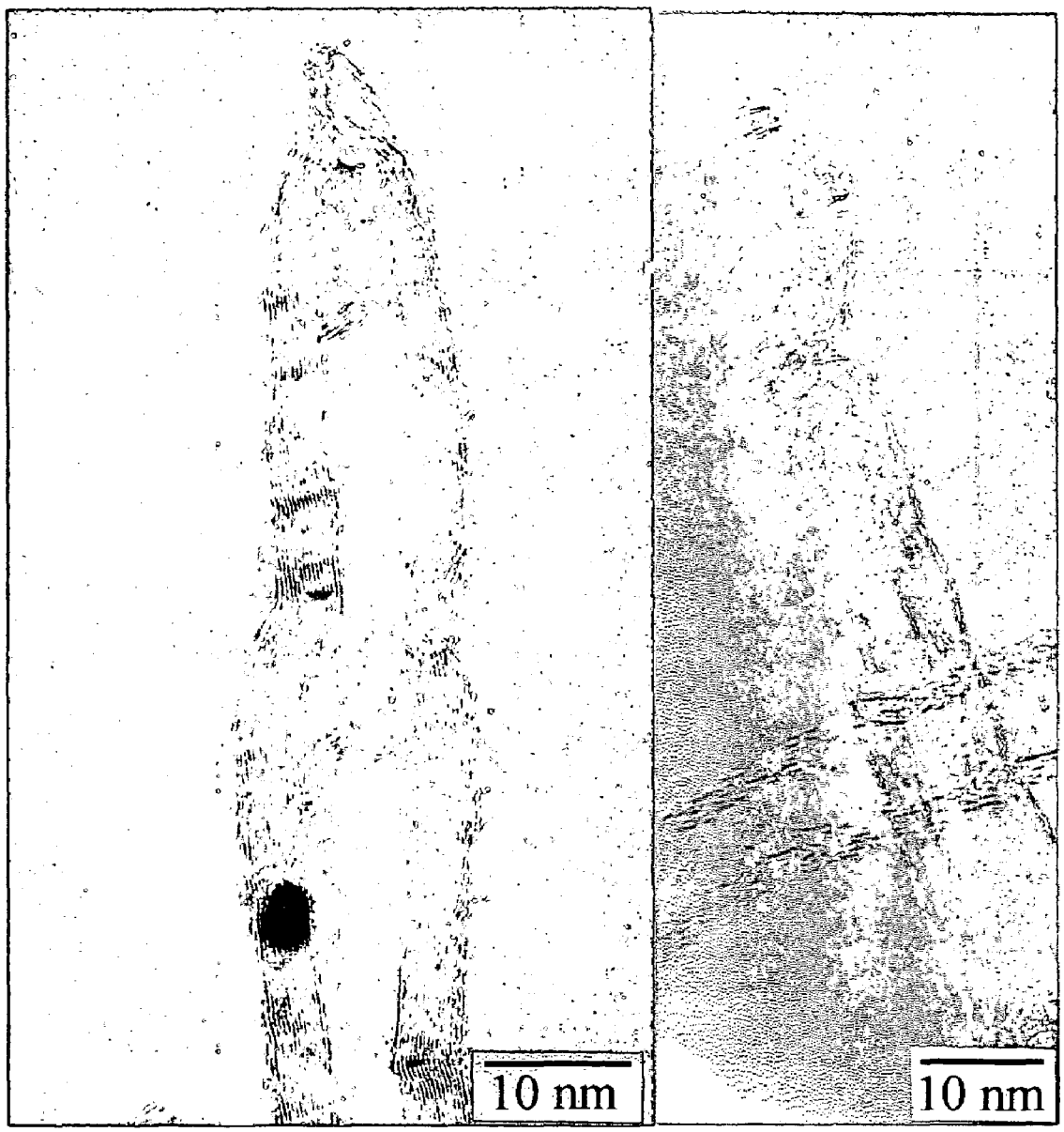
FIG. 5 shows further images by HRTEM of the synthesized carbon nanotube.

FIG. 5 shows further images by HRTEM of the synthesized carbon nanotube. As is seen from the Figure, the tip of the carbon nanotube is closed with an almost one-piece cap. Seen as a black spot in the Figure has been confirmed to be Fe. And as such, Fe on the Si substrate was detected in a region of the tip of each of a few carbon nanotubes. The carbon nanotubes have their roots resting on the substrate surface, each in the form of an open tube.

Next, Example 2 is shown.

In this Example, too, the same synthesis conditions as in Example 1 were adopted except the use of different temperatures and of ethanol instead of methanol to be able to form carbon nanotubes. A Si substrate was heated to a temperature of 860° C. in an ethanol liquid which was held at a temperature of 70° C.

Figure 6:
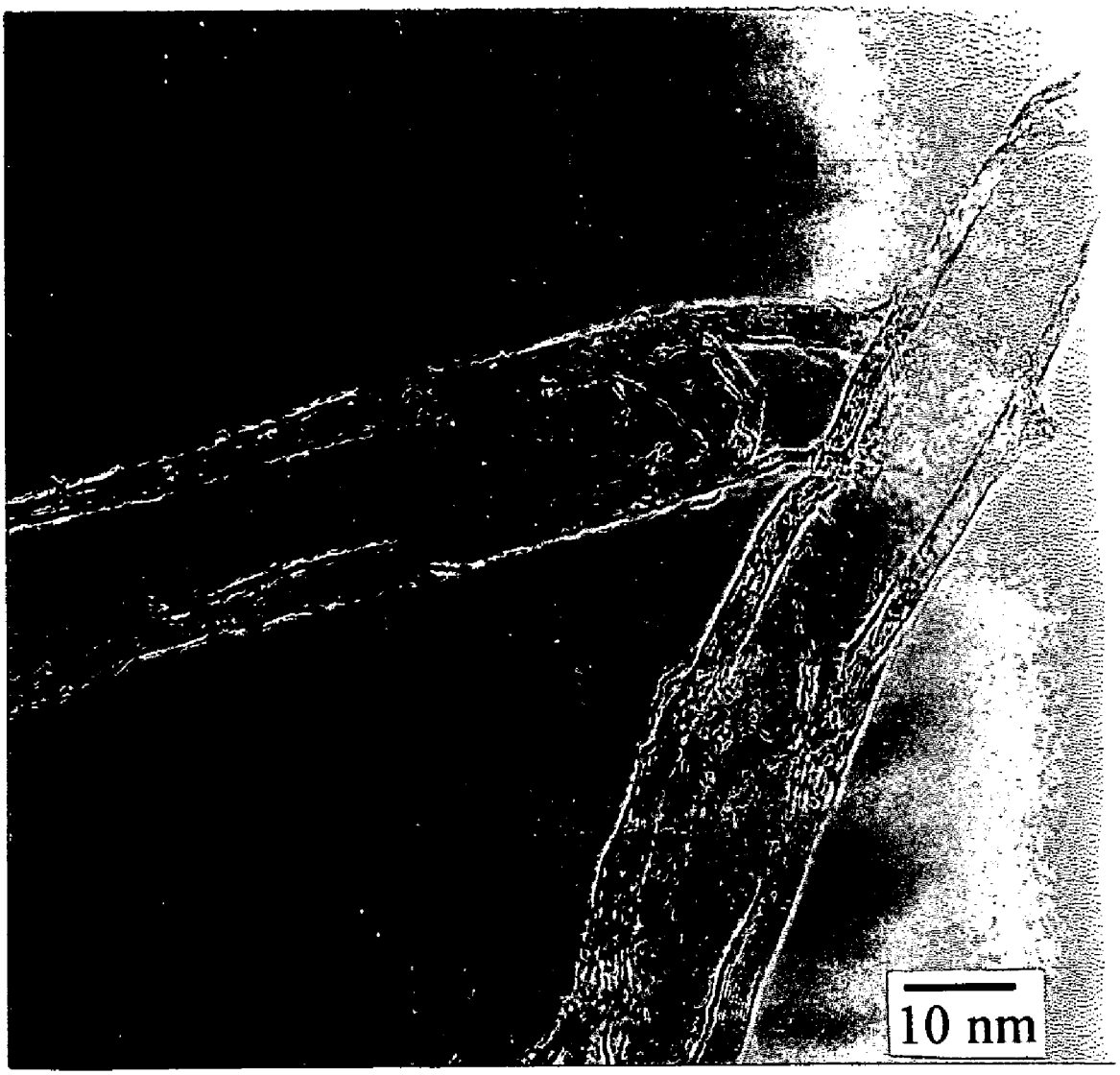
FIG. 6 shows an image by HRTEM of a carbon nanotube grown on a Si substrate in ethanol.

FIG. 6 shows an image by HRTEM of a carbon nanotube then grown on the Si substrate in the ethanol liquid held at 70° C. As is apparent from FIG. 6, the carbon nanotube then formed is a nearly hollow and multi-layered carbon nanotube. The carbon nanotubes had a ratio of their radius to tube shell thickness ranging from 2.2 to 5.8. The carbon nanotubes as those in Example 1 had their tips each closed with an almost one-piece cap.

Next, an example is shown which substantiates the catalytic function of a Fe thin film.

Namely, using a Si substrate not formed with the Fe thin film, Example 1 was carried out to make a synthesis from methanol, but failed to grow carbon nanotubes as in the Example. This result demonstrates the catalytic role of Fe.

Next, an example is shown which substantiates the effectiveness of the in-hydrogen plasma treatment.

Namely, Example 1 was carried out in methanol for a Si substrate formed with a Fe thin film but not subjected to the in-hydrogen plasma treatment.

Figure 7:
FIG. 7 shows SEM images of carbon nanotubes synthesized without having the hydrogen plasma treatment.
Figure 7:

FIG. 7 shows SEM images of carbon nanotubes synthesized without having the in-hydrogen plasma treatment. As is apparent from the Figure, the carbon nanotubes synthesized with the Si substrate formed with a Fe thin film but not subjected to the in-hydrogen plasma treatment were irregular in arrangement and widespread in diameter. It is seen that all the carbon nanotubes lie while being curved in various ways on the substrate, some of which stick to one another to make something like beams. From this, it is seen that the in-hydrogen plasma treatment is effective to synthesize carbon nanotubes which are uniform in system and grow perpendicular to the Si substrate.

Methanol and ethanol are each one of the most common organic liquids. They are colorless liquids having their respective boiling points of 64.96° C. and 78.5° C. When contacted with air, they may explode or burn into almost colorless flame. The safety of an organic liquid is assured, however, if the high-temperature substrate is immersed therein and thus prevented from contacting with the atmosphere. In this system designed by the present inventors, use is made of a water coolant for the heated organic liquid and of condensing a gasified portion thereof to maintain the organic liquid at a temperature lower than its boiling point. The safety is thereby made all the more certain.

In the forms of implementation illustrated, mention was made only of methanol and ethanol for the organic liquid. It will be obvious, however, that the use of other selected types of organic liquids allows making carbon nanotubes of various types and nanotubes composed of or containing another or other elements than carbon.

It should be noted that a method of synthesizing a highly oriented, aligned carbon nanotube or nanotubes from an organic liquid in accordance with the present invention involves several important features.

First, a carbon nanotube is formed by a catalytic reaction in a thermal non-equilibrium state. Also, the end of growth of a carbon nanotube is its root portion on a substrate surface where the temperature in the organic liquid can be controlled.

Second, the liquid surrounding the substrate allows a large temperature gradient to be created in a direction perpendicular to the substrate surface which is the root portion of a carbon nanotube. This large temperature gradient is considered to be an important generative power for the growth of a carbon nanotube in a direction perpendicular to the substrate surface.

Third, the method of synthesis according to the present invention is extremely simple, yet allowing highly (coaxially) oriented, aligned carbon nanotube to be formed over a large area. Also, introducing another element or other elements into the source liquid allows a carbon nanotube or nanotubes doped with the element or elements to be synthesized. Further, a carbon nanotube according to the present invention is hollow and can thus be filled with a material as desired by the utilization of its capillary action.

INDUSTRIAL APPLICABILITY

As will have been appreciated from the foregoing description, a method of synthesizing highly oriented, aligned carbon nanotubes from an organic liquid in accordance with the present invention allows carbon nanotubes aligned as highly (coaxially) oriented to be synthesized in bulk and at low cost. Also, the method of synthesis according to the present invention allows adaptation of a variety of existing Si technologies and is thus adapted for industrial mass production. The present method requires neither vacuum nor any gaseous source material and is thus suitable for industrial production. Further, it should be a basic technology for the synthesis of a variety of types of nanotubes and nanotube layer, especially an extremely important technology for making hollow nanotubes and doped nanotubes.

Also, an apparatus according to the present invention for synthesizing highly oriented, aligned carbon nanotubes from an organic liquid allows synthesizing carbon nanotubes in bulk, at low cost and in safety.

Further, highly oriented/aligned carbon nanotubes according to the present invention can be synthesized in the form of a bundle of carbon nanotubes oriented, aligned highly coaxially, which when used in a variety of products brings about various excellent effects including extremely high usability.

What is claimed is:

1. A method of synthesizing highly oriented, aligned carbon nanotubes from an organic liquid, comprising:
    forming a substrate with a buildup thereon of a thin film or fine insular particles composed of at least one metallic element;
    exposing said substrate having said buildup to a hydrogen plasma; and
    heating said substrate exposed to the hydrogen plasma in an organic liquid to a predetermined temperature whereby highly oriented, aligned carbon nanotubes are synthesized,
    wherein said organic liquid is alcohol.

2. A method of synthesizing highly oriented, aligned carbon nanotubes from an organic liquid as set forth in claim 1, wherein said substrate is a Si substrate.

3. A method of synthesizing highly oriented, aligned carbon nanotubes from organic liquid as set forth in claim 1, wherein said at least one metallic element of which said buildup is composed is one or more elements selected from the group which consists of Fe, Co and Ni.

4. A method of synthesizing highly oriented, aligned carbon nanotubes from an organic liquid as set forth in claim 1, wherein said alcohol is methanol or ethanol.

5. A method of synthesizing highly oriented, aligned carbon nanotubes from an organic liquid as set forth in claim 1, wherein said step of heating to a predetermined temperature comprises heating by passing an electric current through said Si substrate.

6. A method of synthesizing highly oriented, aligned carbon nanotubes from an organic liquid as set forth in claim 1, wherein said organic liquid is pyrolyzed by catalytic function of said metallic element and sharp temperature gradient generated between said substrate and said organic liquid, thereby forming carbon atoms from said organic liquid to synthesize said carbon nanotubes.

7. A method of synthesizing highly oriented, aligned carbon nanotubes from an organic liquid, comprising:
    forming a substrate with a buildup thereon of a thin film or fine insular particles composed of a metallic element;
    exposing said substrate to a hydrogen plasma and heating, thereby said thin film or insular fine particles consisting of a metallic element is made liquid fine particles of uniform diameter and distribution to be distributed insularly and bonded firmly on said substrate;
    heating said substrate to the predetermined temperature so that said pyrolysis is generated in the organic liquid to form carbon atoms by catalytic function of said metallic element and sharp temperature gradient; and maintaining said organic liquid at a temperature lower than its boiling point at the same time, thereby carbon nanotubes are synthesized on said liquid fine particles, wherein said organic liquid is alcohol.

8. A method of synthesizing highly oriented, aligned carbon nanotubes from an organic liquid as set forth in claim 7, wherein said substrate is a Si substrate.

9. A method of synthesizing highly oriented, aligned carbon nanotubes from organic liquid as set forth in claim 7, wherein said at least one metallic element of which said buildup is composed is one or more elements selected from the group which consists of Fe, Co and Ni.

10. A method of synthesizing highly oriented, aligned carbon nanotubes from an organic liquid as set forth in claim 7, wherein said alcohol is methanol or ethanol.

11. A method of synthesizing highly oriented, aligned carbon nanotubes from an organic liquid as set forth in claim 7, wherein said step of heating to a predetermined temperature comprises heating by passing an electric current through said Si substrate.

* * * * *